US012673786B2

(12) United States Patent
Lepage et al.

(10) Patent No.: US 12,673,786 B2
(45) Date of Patent: Jul. 7, 2026

(54) DISPLAY SYSTEM OF AN AIRCRAFT SUITABLE FOR DISPLAYING A FLARE FLOOR SYMBOL AND ASSOCIATED DISPLAY METHOD

(71) Applicant: DASSAULT AVIATION, Paris (FR)

(72) Inventors: Sébastien Lepage, Saint-Cloud (FR); Arnaud Turpin, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 460 days.

(21) Appl. No.: 18/118,396

(22) Filed: Mar. 7, 2023

(65) Prior Publication Data

US 2023/0286670 A1 Sep. 14, 2023

(30) Foreign Application Priority Data

Mar. 10, 2022 (FR) ...................................... 22 02091

(51) Int. Cl.
B64D 45/08 (2006.01)
(52) U.S. Cl.
CPC ..................................... B64D 45/08 (2013.01)
(58) Field of Classification Search
CPC ........ B64D 45/08; B64D 43/00; B64D 45/04; G08G 5/21; G08G 5/54; G01C 23/005
See application file for complete search history.

(56) References Cited

U.S. PATENT DOCUMENTS

| | | | |
|---|---|---|---|
| 4,368,517 A | 1/1983 | Lovering | |
| 2012/0095625 A1* | 4/2012 | Ishihara | B64C 25/00 340/963 |

| | | | |
|---|---|---|---|
| 2013/0103233 A1 | 4/2013 | Bourret et al. | |
| 2014/0097295 A1 | 4/2014 | Bouffanais et al. | |
| 2014/0097973 A1 | 4/2014 | Baudson et al. | |
| 2014/0100721 A1 | 4/2014 | Baudson et al. | |
| 2014/0214245 A1 | 7/2014 | Baudson et al. | |
| 2015/0123821 A1 | 5/2015 | Greene et al. | |
| 2015/0348299 A1 | 12/2015 | Ott | |
| 2016/0046386 A1 | 2/2016 | Eberle | |
| 2016/0117930 A1* | 4/2016 | Eaton, Jr. | G01C 21/20 701/14 |
| 2016/0376026 A1 | 12/2016 | Baudson et al. | |
| 2016/0376027 A1 | 12/2016 | Lepage et al. | |
| 2016/0379502 A1* | 12/2016 | Lepage | G08G 5/21 701/16 |

FOREIGN PATENT DOCUMENTS

EP 3109596 A1 12/2016

OTHER PUBLICATIONS

Search Report for priority application FR 22 02091.
James Albright: "Heads Up Display—Symbology", Dec. 1, 2013, URL:http://code7700.com/g450_hud_symbology.html, p. 9.

* cited by examiner

*Primary Examiner* — Davetta W Goins
*Assistant Examiner* — Sharmin Akhter
(74) *Attorney, Agent, or Firm* — Davidson Kappel LLC

(57) ABSTRACT

An aircraft display system includes a display; and a unit for generating display on the display, suitable for dynamically displaying on the display at least one horizon line, a slope scale with respect to the horizon line, and a velocity vector symbol. When approaching a landing strip, the display generating unit is suitable for displaying, below the horizon line, a flare floor symbol, defining, along with the horizon line, a range of possible slope values for the flare.

20 Claims, 7 Drawing Sheets

1

DISPLAY SYSTEM OF AN AIRCRAFT SUITABLE FOR DISPLAYING A FLARE FLOOR SYMBOL AND ASSOCIATED DISPLAY METHOD

TECHNICAL FIELD

The present disclosure relates to a display system for an aircraft, including:

a display;

a unit for generating the display on the display, suitable for dynamically displaying on the display at least one horizon line, a slope scale with respect to the horizon line, and a velocity vector symbol.

Such a system is intended for being installed in the cockpit of an aircraft in order to be associated with a display in the cockpit. The display is e.g. an at least partially transparent display, such as a semi-transparent screen placed in front of a windshield of the cockpit, a system for projecting images onto the windshield of the cockpit, a semi-transparent sun visor, a helmet visor, or a semi-transparent eyeglass close to the eye.

In a variant, the display is a head-down display integrated into the cockpit dashboard.

The display system is intended for facilitate piloting during the landing of an aircraft on a terrain.

BACKGROUND

Known systems simultaneously display a horizon line, a slope scale and a velocity vector symbol which allow the pilot to easily view the slope of the aircraft by means of the relative position of the velocity vector symbol with respect to the horizon line.

When landing an aircraft, the pilot uses the displayed horizon line for positioning the slope of the aircraft with respect to the runway. The pilot progressively raises the velocity vector symbol with respect to the horizon line, during the flare phase, above the runway, so as to place the velocity vector symbol below the horizon line at a specified distance from the horizon line corresponding to a target slope, e.g. on the order of 1° below the horizon line, before touchdown. Such a maneuver leads to a comfortable touchdown of the aircraft on the runway.

With regard to facilitating the task of the pilot, EP3109596 describes the display of a flare guidance symbol on the screen, which gradually raises towards the horizon line, following a nominal control law. To follow the guidance proposed by the control law, the pilot has to make the flare guidance symbol coincide with the velocity vector symbol, in order to follow a specified trajectory for the flare.

Such a symbol thus facilitates the work of the crew and prevents a too long landing or a too abrupt landing.

However, making the velocity vector symbol coincide with the flare guidance symbol is a dynamic and accurate task which requires high concentration from the pilot.

Furthermore, the nominal control law forces the pilot to follow a predefined flare maneuver whereas in some cases the pilot can want to perform a shorter flare maneuver with a stronger touch down in the event of landing on a short runway, or, on the other hand, in other cases, perform a very soft landing, in particular if the pilot has a very long runway length available compared to the length required for the aircraft.

An aim of the present disclosure is thus to provide an aircraft display system which makes it possible to perform flare maneuvers which can be adapted to the needs of the crew, while facilitating the task of the crew.

SUMMARY

To this end, the subject matter of the present disclosure is a system of the aforementioned type, characterized in that, when approaching a landing strip, the display generator is suitable for displaying, below the horizon line, a flare floor symbol, defining with the horizon line, a range of possible slope values for the flare.

The system according to the present disclosure can comprise one or a plurality of the following features, taken individually or according to any technically possible combination:

the display generator is suitable, in a first flare phase, to raise the flare floor symbol up toward the horizon line, and is suitable, in a second flare phase subsequent to the first flare phase, to maintain the flare floor symbol at a constant distance from the horizon line;

the display generator is suitable for determining a nominal flare control law, defining a vertical speed increase profile during the flare, the position of the flare floor symbol being defined according to the nominal control law, with an offset with respect to the nominal control law;

the offset with respect the nominal control law of the flare floor symbol varies according to the vertical speed of the aircraft;

the display generator is suitable for displaying a flare initiation symbol, located above the flare floor symbol, and for defining, along with the velocity vector symbol, a position for the recommended start of a flare advantageously corresponding to the horizontal coincidence between the velocity vector symbol and the flare initiation symbol;

the display generator is suitable for suppressing the display of the flare initiation symbol from the position for the recommended start of a flare;

the flare initiation symbol is positioned according to the nominal control law;

when approaching the landing strip, the display management unit is suitable for generating, on the horizon line, a region deformed according to the topographic slope of the landing strip approached by the aircraft, the flare floor symbol being arranged facing the deformed region;

the flare floor symbol has a horizontal segment parallel to the horizon line;

the flare floor symbol is centered horizontally on the velocity vector symbol;

the system comprises a warning generator, suitable for generating a visual, an auditory or a tactile warning, when the velocity vector symbol moves below the flare floor symbol.

A further subject matter of the present disclosure is a display method in an aircraft, comprising the following steps:

provision of a system as defined above;

when approaching a landing strip, display on the display by the display generator, below the horizon line, of a flare floor symbol defining, along with the horizon line, a range of possible slope values for the flare.

DESCRIPTION OF THE DRAWINGS

The present disclosure will be better understood upon reading the following description, given only as an example and making reference to the enclosed drawings, wherein.

DETAILED DESCRIPTION

Figure 1:
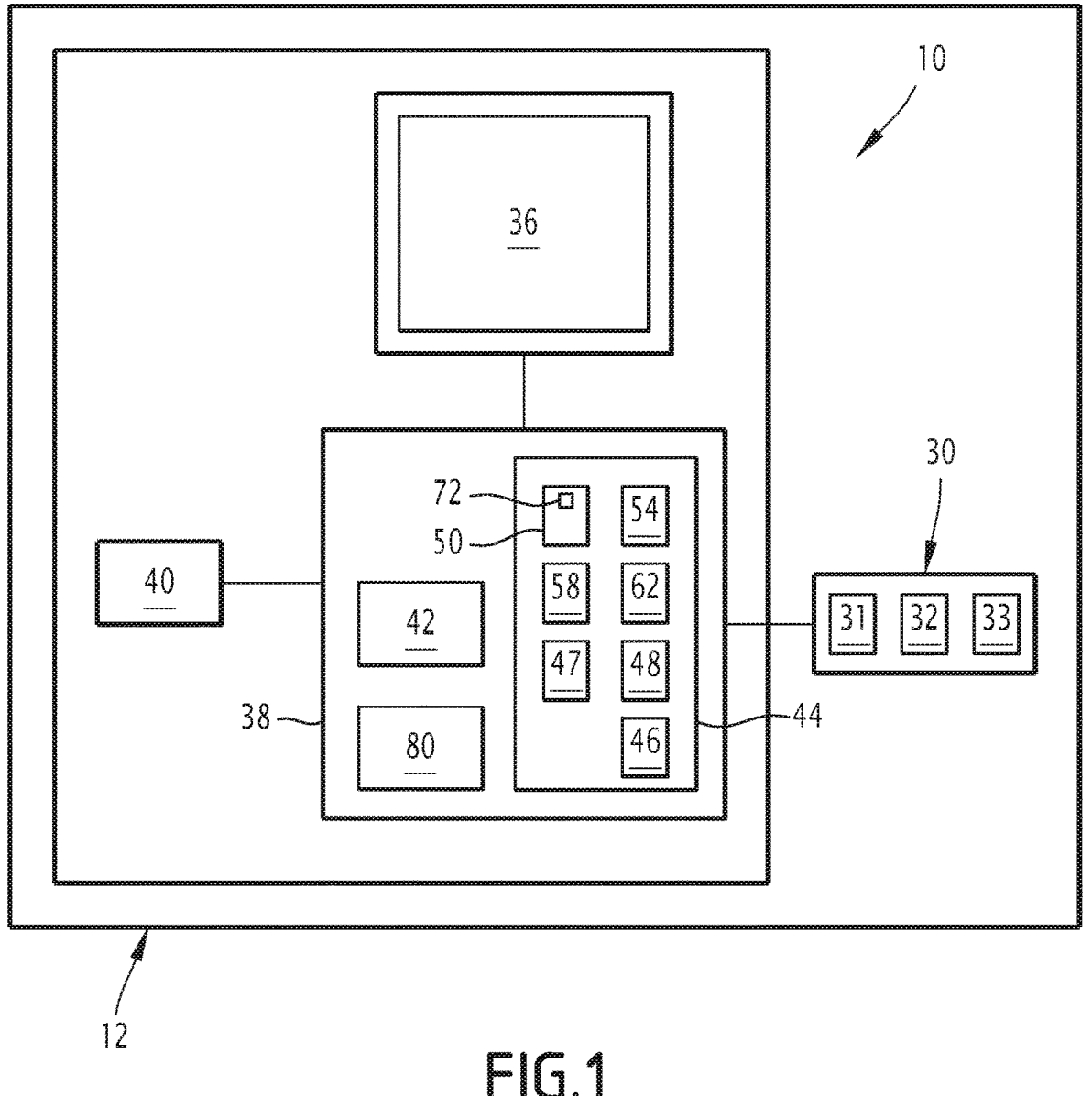
FIG. 1 is a schematic view of a first display system in an aircraft, according to the present disclosure.
Figure 2:
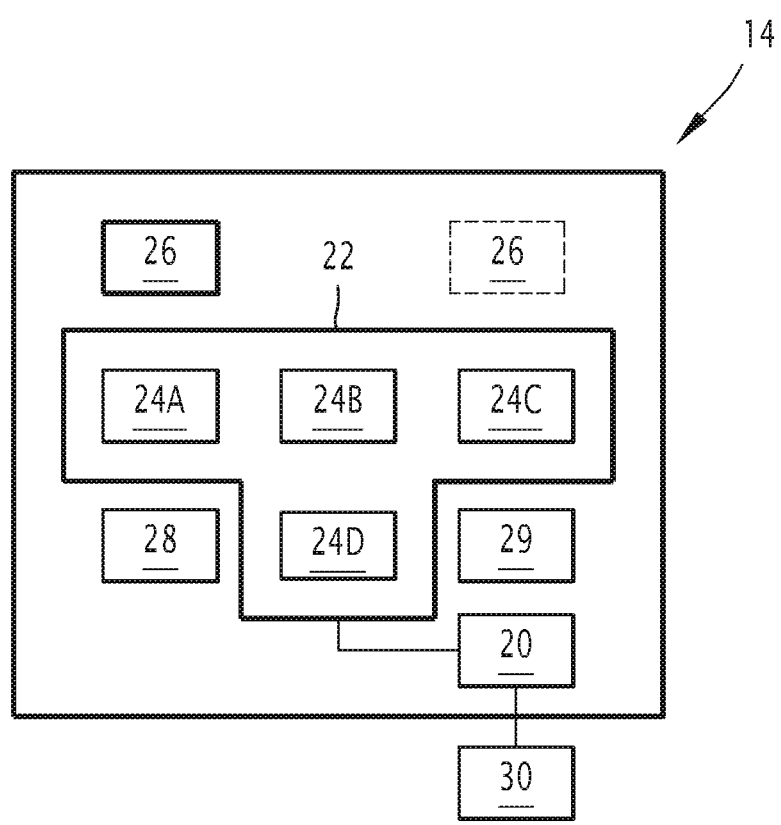
FIG. 2 schematically illustrates the cockpit of an aircraft comprising the first display system.

A first display system 10 for an aircraft 12 according to the present disclosure is illustrated schematically in FIGS. 1 to 2.

The system 10 is intended for being installed in an aircraft 12, for the display of information on a display present in the cockpit 14 of the aircraft schematically represented in FIG. 2. The cockpit 14 of the aircraft 12 is generally located in the aircraft 12, at the front thereof. In a variant, applicable in particular to drones, the cockpit 14 is located in a ground control station.

Figure 3:
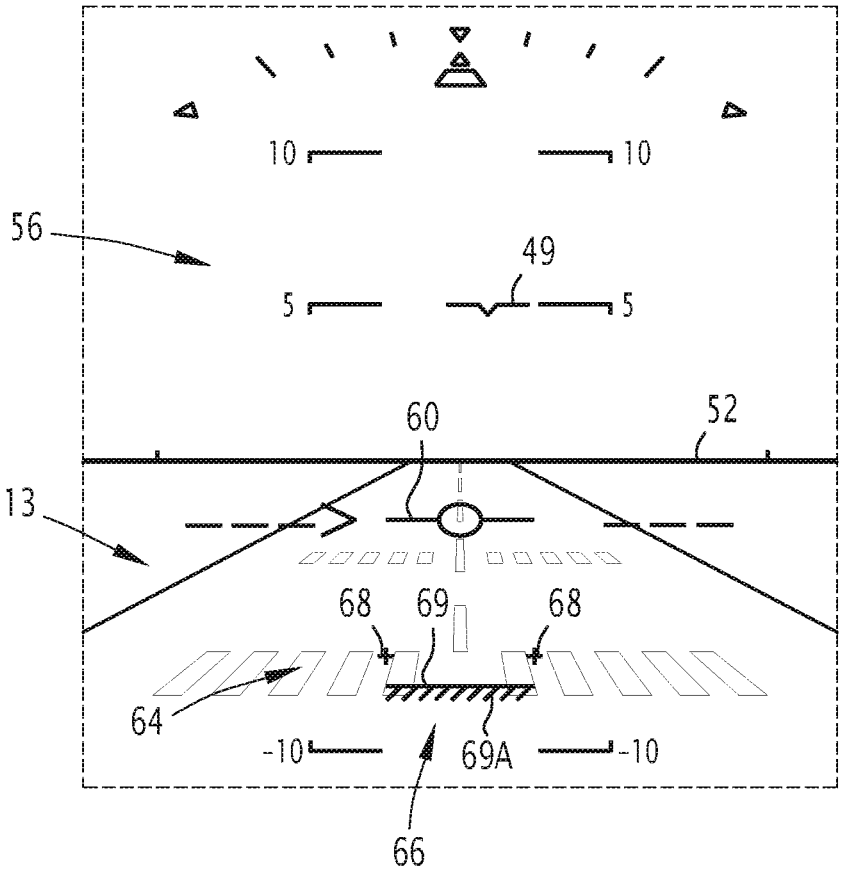
FIGS. 3 to 4 illustrate the display generated by the display system when approaching the aircraft to flat landing strip.

The system 10 is intended for assisting the pilot of the aircraft during an approach phase, in the vicinity of a landing strip 13, visible e.g. in FIG. 3.

With reference to FIG. 2, the cockpit 14 is provided with a main display system 22 connected to a central avionics unit 20.

The main system 22 allows the crew to pilot the aircraft, to manage the navigation thereof, to monitor and to control the various functional systems present in the aircraft. The system 22 includes a dashboard provided with a plurality of basic screens 24A to 24D forming head-down displays.

In the present example, the cockpit 14 is further advantageously provided with at least one head-up semi-transparent screen 26, placed facing the windshield, or even with two head-up semi-transparent screens 26.

The cockpit 14 is further provided with a control member 28 for controlling the piloting of the aircraft, such as a joystick or a stick.

It advantageously comprises an automatic piloting system 29 suitable for being activated by the crew.

In a known manner, the basic screens 24A and 24C are e.g. primary display screens intended for the display of flight parameters of the aircraft. The basic screens 24B and 24D are e.g. multifunctional screens for navigation and/or for tracking and controlling avionic systems.

The main display system 22 is provided with a display management unit (not shown) suitable for displaying the various windows present on the screens 24A to 24D.

The central avionic unit 20 is connected to a system 30 of sensors which measure aircraft parameters of the aircraft 12.

With reference to FIG. 1, the system 30 of measuring sensors includes e.g. sensors for measuring parameters which are external to the aircraft, such as temperature, pressure or speed, sensors for measuring parameters which are internal to the aircraft and the different functional systems thereof, and positioning sensors, such as geographic position sensors 31, in particular a GPS sensor, sensors 32 for determining the slope of the aircraft, in particular at least one inertial unit, and a sensor 33 for determining a height with respect to the ground, in particular a radio altimeter.

The sensors of the system 30 are suitable for providing a datum on the geographical position of the aircraft 12, on the speed thereof, the heading thereof and the attitude (longitudinal attitude, roll angle) thereof.

With reference to FIG. 1, the display system 10 according to the present disclosure is connected to the system 30 of measuring sensors.

The display system 10 includes at least one display 36, and a unit 38 for generating a display on the display 36, connected to the display 36 and to the system 30 of measuring sensors. The system 10 further includes a human/machine interface 40.

The display 36 is e.g. one of the screens 24A to 24B and/or is the semi-transparent head-up screen 26 of the cockpit 14. In other variants, the display 36 is e.g. a system for projecting images onto the windshield of the cockpit, a semi-transparent sun visor, a helmet viewfinder or a semi-transparent eyeglass close to the eye.

In a first embodiment, which will be described hereinafter, the display 36 of the display system 10 according to the present disclosure is the semi-transparent head-up screen 26 of the cockpit 14.

The display generator 38 includes at least one processor 42 and at least one memory 44 containing a plurality of software modules suitable for being executed by the processor 42. It includes a database 46 with the characteristics of the landing strip, e.g. stored in the memory 44.

The display generator 38 includes a module 48 for retrieving data from the measurement sensors of the system 30, in particular from the sensor 32 for measuring the slope of the aircraft 12, and from the sensor 33 for measuring the height of the aircraft 12 with respect to the ground.

The display generator 38 further includes a module 47 for generating a scale model symbol 49 of the aircraft, a module 50 for generating an artificial horizon line 52, and an associated module 54 for generating a slope scale 56.

The display generator 38 further comprises a module 58 for generating a velocity vector symbol 60. It comprises a module 62 for generating a flare initiation symbol 64, visible in FIG. 3, and a flare floor symbol 66, suitable for defining, along with the artificial horizon line 52, a range 67 of possible slope values for the flare (see FIG. 5).

The display generator 38 further includes modules (not shown) for generating other symbols representative of flight parameters, e.g. an altitude indicator, an airspeed indicator, a vertical speed indicator, a ground speed indicator, an engine information indicator, and an aircraft lift conformation indicator.

The generation module 47 is suitable for generating the display of an aircraft model symbol 49 which embodies a projection to infinity of the longitudinal axis of the aircraft 12, from the data received from the sensors of the system 30 of measuring sensors.

The generation module 50 is suitable for determining, from the data received from the sensors of the system 30 of measuring sensors, the position of an artificial horizon line 52 with respect to the current attitude of the aircraft. The horizon line 52 is straight when the aircraft 12 flies with flat wings and inclines according to the heel angle of the aircraft 12.

The generation module 54 is suitable for generating a slope scale 56 centered horizontally on the horizon line 52. The slope scale 56 is e.g. graduated in degrees of slope with respect to the artificial horizon line 52.

The generation module 58 is suitable for generating the display of a velocity vector symbol 60 indicating the direction of the velocity vector of the aircraft 12, on the basis of the data received from the sensors of the system 30. The vertical distance between the artificial horizon line 52 represents the ground slope γ of the aircraft 12, taken with respect to a non-inclined ground.

The generation module 62 is suitable for generating the display of the flare initiation symbol 64 at the end of the approach towards the landing strip 13.

It is suitable for displaying the flare initiation symbol 64 for warning the crew about the proximity and subsequent reaching of a position for the recommended start of a flare maneuver preferentially a recommended height for starting a flare maneuver. The position for a recommended start of a flare maneuver is preferentially determined taking into account the topographic slope of the landing strip 13.

The position for the recommended start of a flare maneuver is determined by the generation module 62 advantageously according to a topographic slope datum coming from a database of the landing strip 13, as determined using the database of the landing strips 46, using a calculation application, either by using the threshold and end of runway altitudes and runway length contained in database 46, or by directly using a slope contained in database 46.

The position for a recommended start of a flare maneuver is determined by also taking into account the measured aircraft slope γ.

Advantageously, the generation module 62 includes a database of heights at the beginning of a flare maneuver, according to the aircraft slope γ measured by the sensor 32 and, if appropriate, of the topographic slope I of the landing strip 13, as determined by the calculation application, in particular according to the apparent slope $\gamma_R$ calculated from the aircraft slope γ and the topographic slope I.

The generation module 62 is suitable for notifying about reaching the recommended height for starting a flare maneuver by placing the flare initiation symbol 64 opposite the velocity vector symbol 60.

Preferentially, to indicate that the aircraft 12 has reached the recommended height for starting a flare, the flare initiation symbol 64 is arranged at the same horizontal level as the velocity vector symbol 60, in horizontal coincidence therewith.

In such example, the flare initiation symbol 64 includes at least one pictogram 68, preferentially two pictograms 68 at the same horizontal level, intended for being positioned laterally on either side of the velocity vector symbol 60. In the example shown in FIG. 3, the pictograms 68 are crosses.

To allow the pilot to anticipate the reaching of the recommended position for starting a flare maneuver, the generation module 62 is advantageously suitable for displaying the flare initiation symbol 64 below the velocity vector symbol 60 before reaching the position for the recommended start of a flare maneuver and to bring same vertically closer to the velocity vector symbol 60 in order to reach the symbol velocity vector 60 at the position for the recommended start of the flare maneuver.

Once the position for the recommended start of a flare maneuver has been reached, the generation module 62 is preferentially suitable for making disappear, the display of the flare initiation symbol 64.

The generation module 62 is suitable for generating the display of the flare floor symbol 66 below the horizon line 52, and facing the latter, so as to define the range 67 of possible slope values for the flare.

The flare floor symbol 66 herein includes a horizontal segment 69, intended to extend parallel to the horizon line 52 so as to define the range 67 of possible slope values for the flare, and hatching 69A which extends downward from segment 69 so as to show an unrecommended range of slope values.

The generation module 62 is suitable, during an initial phase wherein the flare initiation symbol 64 is still displayed, for raising the flare floor symbol 66 together with the flare initiation symbol 64.

The flare floor symbol 66 is offset vertically from the position of the flare initiation symbol 64, so as to appear below the flare initiation symbol 64.

Then, in a first phase of the flare, once the flare initiation symbol 64 has disappeared, the generation module 62 is suitable for raising the flare floor symbol 66 towards the horizon line 52.

In a second flare phase, the generation module 62 is suitable for maintaining the flare floor symbol 66 below the horizon line 52, with a constant vertical offset with respect to the horizon line 52, said offset corresponding to the range 67 of possible slopes, at the time of the touchdown of the aircraft 12 on the landing strip 13.

Preferentially, the generation module 62 is suitable for determining a nominal flare control law, defining a nominal profile for increasing the vertical speed according to the height during the flare. The nominal profile is the profile which would be followed by a flare guidance symbol potentially displayed on the display 36.

At each instant, the generation module 62 is suitable for displaying the flare floor symbol 66 on the basis of the nominal flare control law with a given downwards vertical offset.

The nominal control law is representative of an increase profile for the vertical speed during the flare.

The control law links, e.g., for each slope γ, or if the slope of the landing strip 13 is taken into account, for each apparent slope $\gamma_R$ of the aircraft 12 with respect to the landing strip 13, a height from the landing strip 13, with a target vertical speed, and as a result with a target slope on the slope scale 56.

The control law can be used to evolve from a first vertical speed at a flare start, when the aircraft 12 reaches the recommended height for starting a flare, to a second target vertical speed at the end of flare, greater than the first vertical speed when the aircraft 12 reaches the end of flare before touchdown. It advantageously takes into account the topographic slope of the landing strip 13.

Preferentially, the second target vertical speed at the end of flare, which applies to the end of flare, is calculated according to the topographic slope of the landing strip 13.

The generation module 62 is suitable for determining at each instant the second target vertical speed according to the topographic slope of the landing strip 13. The topographic slope is initially estimated using topographic data from a database as described hereinabove and is then obtained by calculation using height data and slope data measured by the sensors 33 and 32, respectively.

The vertical offset of the flare floor symbol 66 with respect to the vertical position it would occupy if it were to follow the nominal control law is e.g. constant over at least part of the first phase of the flare and/or the second phase of the flare.

The vertical offset is e.g. calculated according to the slope γ, or if the slope of the landing strip 13 is taken into account, according to the apparent slope $\gamma_R$. It is also advantageously calculated as a function of the height with respect to the landing strip 13 at a target vertical speed.

In a first embodiment, the vertical offset is constant and results in a constant vertical speed difference with respect to the nominal law, which is advantageously equal to the final set point of the nominal law. The constant value e.g. is equal to −3 feet per second, i.e. −1 meters per second. Thereby, the nominal law set point is halfway between the horizon line 52 and the flare floor symbol 66.

In a variant, the vertical offset varies during the first phase of the flare and/or the second phase of the flare, e.g. according to the height with respect to the landing strip, the slope $\gamma$, $\gamma_R$, and/or the vertical speed Vz, VzR, where Vz is the vertical speed measured with respect to a horizontal plane, and VzR is the apparent vertical speed, as measured taking into account the slope of the landing strip 13.

In such case, the offset with respect to the nominal law varies, e.g. increases when the slope $\gamma$, $\gamma_R$ is higher.

According to the control law and the predefined offset, the flare floor symbol 66 is moved with respect to the horizon line 52, expressing the target vertical speed and the offset relative to the target vertical speed as a slope on the aircraft slope scale 56, as obtained at the height measured, at each instant, by the sensor 33.

Then, once the end of flare has been reached, the generation module 62 is suitable for maintaining the flare floor symbol 66 at a constant distance from the horizon line 52, corresponding to the desired range 67 of slope values at the end of flare, leading to an adequate touchdown of the aircraft 12 on the landing strip 13.

Figure 5:
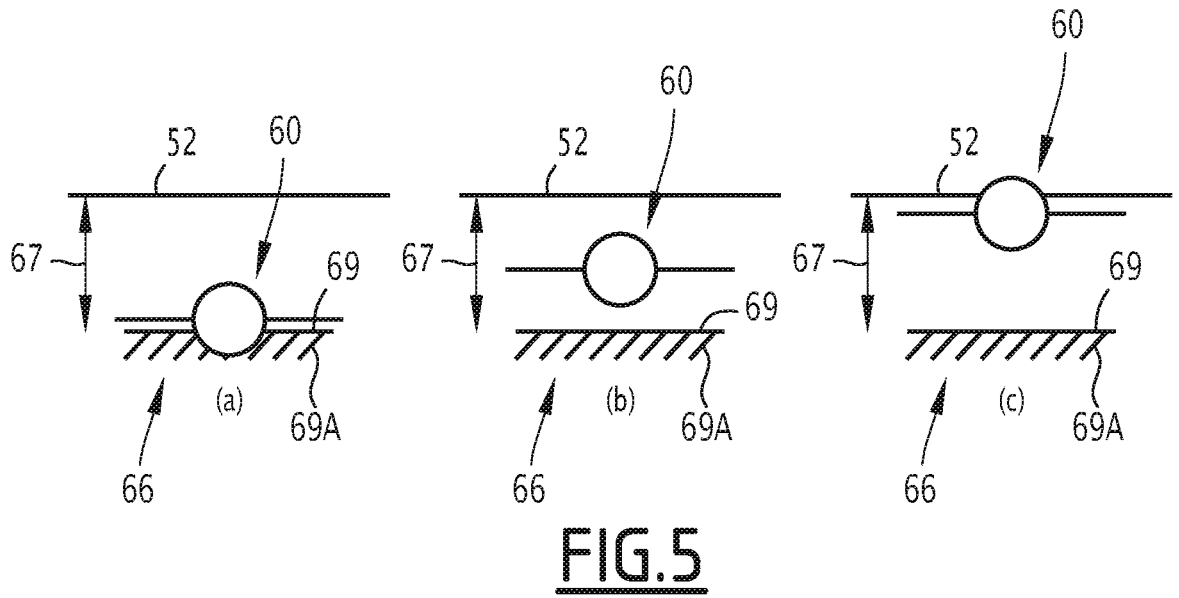
FIG. 5 illustrates various positions of the velocity vector symbol within the range of possible slope values for the flare defined between the flare floor symbol and the horizon line.

Thereby, as illustrated in FIG. 5, the pilot has a range 67 of possible slope values for performing the flare, the range 67 being delimited by the height between the horizon line 52 and the flare floor symbol 66.

The pilot can then adjust the vertical speed of touchdown according to the need thereof, within the proposed range 67. Thereby, as shown in FIG. 5(*a*), when a short landing is required, the pilot moves the velocity vector symbol 60 closer to the flare floor symbol 66 so as to be placed in the vicinity of the flare floor symbol.

During a normal landing (see FIG. 5(*b*)), the pilot is placed substantially in the middle of the range of values 67, the middle corresponding substantially to the slope defined by the nominal control law for the flare.

If the pilot has a long runway length available compared to the capabilities of the aircraft thereof, and if the pilot wishes to make a comfortable landing, the pilot comes closer to the horizon line 52, as illustrated in FIG. 5(*c*).

In any case, the presence of a range 67 allows the pilot not to have to follow a target slope very precisely by following a flare guidance symbol. The pilot can thus concentrate on all the tasks required for landing, and in particular observe the terrain outside the aircraft.

The pilot can adjust the flare as the pilot wants, so that the touchdown is as close as possible to the threshold of the runway, or on the contrary as smooth as possible when the pilot has enough runway length available. The touchdowns obtained are thus comfortable and adaptable for the passengers, and it guarantee maximum safety for the aircraft.

Figure 4:
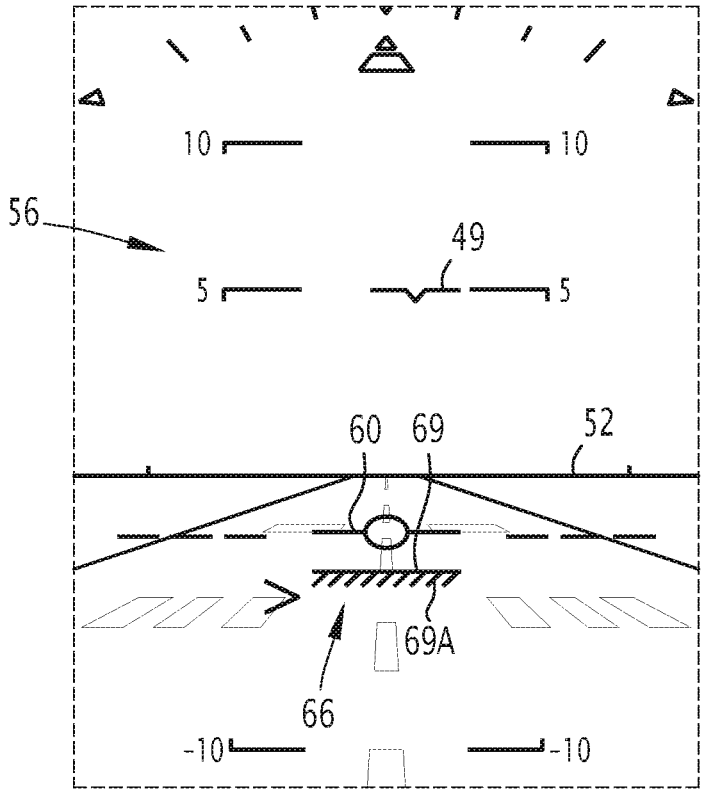

The operation of the display system 10 according to the present disclosure, during the approach towards a landing strip 13 will now be described, with reference to FIGS. 3 to 5.

Initially, the aircraft 12 descends toward the landing strip 13. As shown in FIG. 3, the generation module 50 displays the horizon line 52, the generation module 54 generates the display of a slope scale 56 and the generation module 58 generates the display of a velocity vector symbol 60 the vertical distance of which from the horizon line 52 reflects the aircraft slope, on the slope scale 56.

Then, at a given distance from the landing strip 13, the crew selects the target landing strip 13. The calculation application retrieves topographic data from the runway database 46.

The retrieved topographic data coming from a database are e.g. the altitude at the runway threshold, the altitude at the end of the runway and the length of the runway.

On the basis of the topographic data retrieved from the database 46, the calculation application calculates, if appropriate, a topographic slope coming from a database of the landing strip 13.

Moreover, as illustrated in FIG. 3, to enable the pilot to anticipate the reaching of the position for the recommended start of a flare maneuver, the generation module 62 is suitable for displaying the flare initiation symbol 64, below the velocity vector symbol 60 before the position for the recommended start of a flare maneuver, and vertically move it closer to the velocity vector symbol 60 right to the position for the recommended start of a flare maneuver.

The position for the recommended start of a flare maneuver is then determined by the generation module 62 advantageously according to a topographic slope datum coming from a database of the landing strip 13, determined using the landing strip database 46, by the calculation application as described hereinabove.

The position for the recommended start of a flare maneuver, is further determined taking into account the aircraft slope $\gamma$ measured by the sensor 32.

The generation module 62 notifies about the reaching of the position for the recommended start of a flare maneuver, by placing the flare initiation symbol 64 horizontally opposite the velocity vector symbol 60.

At the recommended height for the start of a flare maneuver, the flare initiation symbol 64 is arranged at the same horizontal level as the velocity vector symbol 60, in horizontal coincidence with the velocity vector symbol 60, preferentially between the pictograms 68.

As mentioned hereinabove, the flare initiation symbol 64 then disappears. The flare floor symbol 66 delimits, along with the horizon line 52, the range of possible slope values 67 during the flare.

The generation module 62 then controls the flare floor symbol getting closer towards the horizon line 52.

The getting closer follows the predetermined nominal control law, with an offset, as described hereinabove.

The control law corresponds to a variation in vertical speed according to the height measured with respect to the landing strip 13, for changing from a first target vertical speed to the position for the recommended start of a flare maneuver, to a second target vertical speed higher than the first target vertical speed at the end of flare.

The generation module 62 determines at each instant, the second target vertical speed depending on the topographic slope of the landing strip 13. The topographic slope is initially estimated using topographic data coming from a database and is then measured from the data received from the sensors 32 and 33, as indicated hereinabove.

At each instant, the generation module 62 receives a height datum measured by means of the sensor 33, and determines the vertical distance separating the flare floor symbol 66 from the horizon line 52 on the basis of the control law and of the calculated offset.

The flare guidance symbol 66 thus gradually approaches the horizon line 52, defining, along with the horizon line 52, a range 67 of possible slope values for performing the flare.

The pilot adjusts the vertical speed of touchdown, as needed, within the proposed range 67, as illustrated by the options (a), (b) and (c) in FIG. 5.

Figure 6:
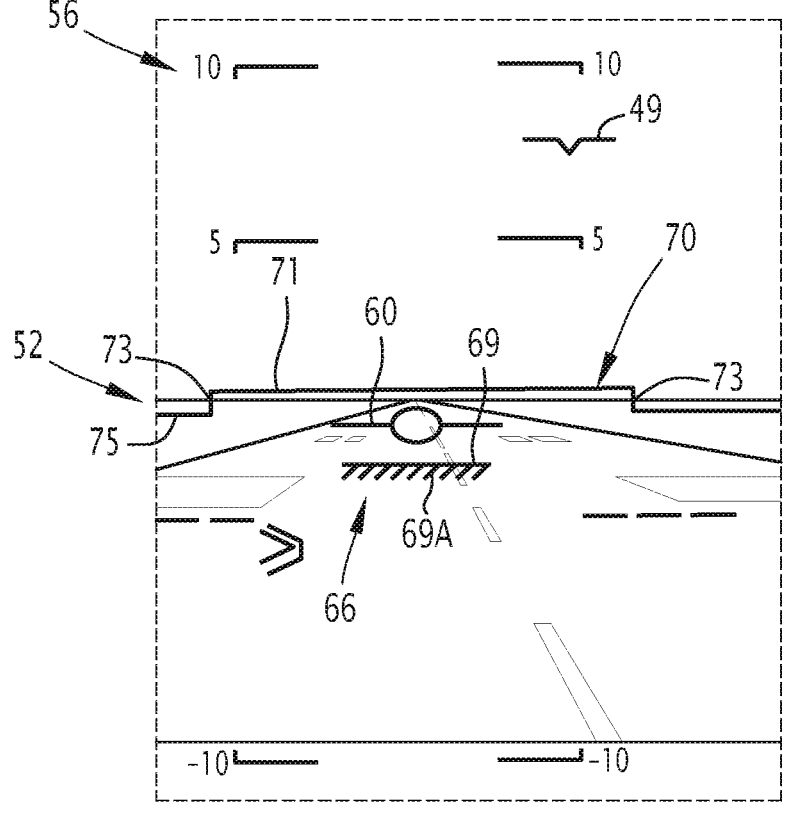
FIG. 6 is a view similar to FIG. 3, for a runway with a positive slope.
Figure 7:
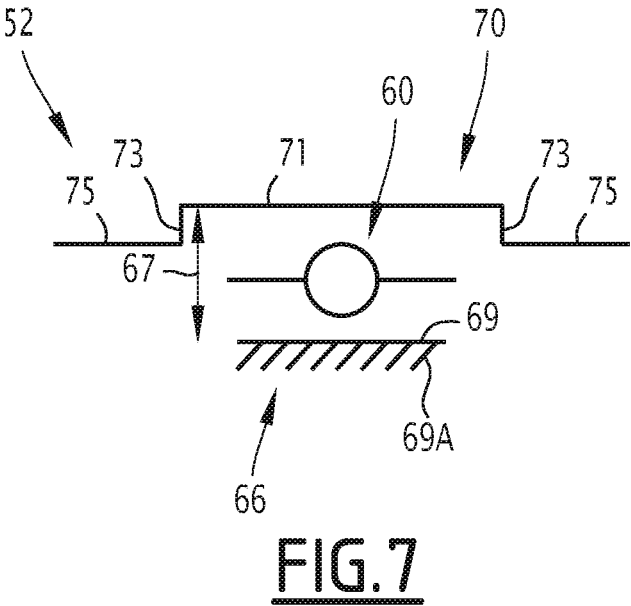
FIG. 7 is a view similar to FIG. 5 for the runway shown in FIG. 6.

In a variant illustrated by FIGS. 6 and 7, in at least one approach phase of the aircraft 12 towards the landing strip 13, the module 50 is suitable for generating, on the horizon line 52, a region 70 deformed according to the topographic slope of the landing strip 13, as described in the European patent EP-B-3109598.

In the example shown in FIG. 6, the deformed region 70 is a region of the horizon line 52 centered on the velocity vector symbol 60. The region has the shape of a crenel with a segment 71 parallel to the rest 75 of the horizon line 52, and two connecting segments 73 inclined or perpendicular with respect to the rest 75 of the horizon line 52.

The slope scale 56 centered horizontally on the rest 75 of the horizon line 52, away from the deformed region 70

In a variant (not illustrated), the deformed region 70 has a curved shape, e.g. the shape of a bump. The curved shape has an apex at a height, measured with respect to the rest 75 of the horizon line 52, which is a function of the topographic slope of the landing strip 13.

The deformed region 70 extends upwards when the topographic slope of the landing strip 13 is positive. The region extends downwards when the topographic slope of the landing strip 13 is negative.

With reference to FIG. 1, the generation module 50 includes a calculation software application 72 suitable for calculating a local deformation of the horizon line 52 in the deformed region 70, according to the topographic slope of the landing strip 13.

"Topographic slope" refers to the actual slope of the landing strip 13 on the terrain.

The vertical deviation between the deformed region 70 and the velocity vector symbol 60 then represents the apparent ground slope $\gamma_R$ of the aircraft 12 with respect to the landing strip 13, taking into account the topographic slope of the landing strip 13.

The deformation of the deformed region 70 is herein characterized by the maximum height thereof, measured vertically with respect to the rest of the horizon line 52.

The calculation application 72 is suitable for recovering at least one topographic datum characteristic of the runway 13, either coming from a database or measured, and for calculating the deformation of the deformed region 70 according the characteristic topographic datum or data.

Advantageously, in a first phase of movement of the aircraft 12 at an axial distance from the landing strip 13, the calculation software application 72 is suitable for retrieving at least one topographic datum from the landing strip database 46, then for calculating the local deformation of the horizon line 52 in the deformed region 70 according to the or each topographic datum coming from a database.

The topographic datum from a database is e.g. the altitude at a given point on the runway and/or the length of the runway. The database 46 includes e.g., for each landing strip 13, the altitude of the runway threshold, the altitude of the end of the runway and the length of the runway.

The calculation software application 72 is then suitable for calculating an estimated slope of the landing strip 13 on the basis of the altitude of the runway threshold, the altitude of the end of the runway and the length of the runway.

In a variant, the topographic datum coming from a database contained in the database 46 is directly the topographic slope in the touchdown zone around the touchdown target point.

In a second phase of movement of the aircraft 12 above the landing strip 13, the calculation software application 72 is suitable for continuously calculating a measured characteristic topographic datum of the landing strip 13, according to the data from the measuring sensors 31, 33 on the aircraft slope and on aircraft height with respect to the ground, as retrieved by the data retrieval module 48.

Such topographic datum is a calculated slope I and is determined in particular from the measurements collected at two successive points P1, P2 of the trajectory of the aircraft 12 at the successive passage times t1, t2, and in particular from the heights h1, h2 measured at the points P1, P2, from the aircraft slope measured between the points P1 and P2, and from the horizontal speed VH of the aircraft 12.

The local topographic slope I of the runway is estimated e.g. by the following equations:

$$\Delta = \arctan\left[(h2-h1)/(VH \times (t2-t1))\right] \qquad (1)$$

$$I = \gamma - \Delta \qquad (2)$$

The maximum height of the deformed region 70 is then calculated by the calculation application 72 so as to correspond to the value of the topographic slope, either coming from a database or measured, of the landing strip 13, measured on the slope scale 56 generated by the module 54.

For example, if the topographic slope coming from a database or measured is an N degree-slope, the maximum height of the deformed region 70 compared to the rest 75 of the horizon line 52 has N degrees on the slope scale 56 generated by the module 54.

In the first phase of movement of the aircraft 12 away from the landing strip 13, the height of the deformed region 70 remains constant. In a second phase of movement of the aircraft 12, above the landing strip 13, the height of the deformed region 70 changes continuously according to the local topographic slope of the landing strip 13 below the aircraft 12, as measured using the sensors of the system 30.

In such example, the deformed region 70 generated by the module 50 is centered with respect to the slope scale 56, and with respect to the velocity vector symbol 60.

The deformed region 70 herein has a width greater than the width of the velocity vector symbol 60, and preferentially than the width of the end of the landing strip 13.

However, the width of the deformed region 70 preferentially remains less than 80%, advantageously less than 50% of the total width of the horizon line 52.

The width of the deformed region 70 is e.g. greater than the width of the velocity vector symbol 60, and less than twice the width of the velocity vector symbol 60.

The deformed region 70 is thus localized. It follows the lateral movement of the velocity vector symbol 60, during movement under crosswind.

With reference to FIG. 7, the generation module 62 is suitable for displaying the flare floor symbol 66 below and facing the deformed region 70. The range 67 of possible slope values for the flare is thus defined by taking into account the slope of the runway by the height separating the deformed region from the flare floor symbol 66.

In a variant (not shown), the display system 10 includes a warning generator 80 suitable for generating a visual, an auditory and/or a tactile warning when the velocity vector symbol 60 moves below the flare floor symbol 66, in particular below the horizontal segment 69 of the flare floor symbol 66. The warning is displayed e.g. on the display 36.

In yet another variant, the automatic pilot system 29 is suitable for automatically taking control of the aircraft 12 so as to modify the aircraft slope, in order to maintain the velocity vector symbol 60 within the range 67 of possible flare values during the flare.

What is claimed is:

1. An aircraft display system for an aircraft, comprising: a display; and a display generator configured to dynamically display on the display a horizon line, a slope scale with respect to the horizon line, and a velocity vector;

the display generator being configured to display, below the horizon line, a flare floor symbol when approaching a landing strip, the flare floor symbol defining, along with the horizon line, a range of possible slope values for a flare of the aircraft, wherein the display generator is configured to determine a nominal flare control law defining a vertical speed increase profile during the flare, a position of the flare floor symbol being defined according to the nominal flare control law, with an offset with respect to the nominal flare control law.

2. The system according to claim 1, wherein during a first phase of the flare, the display generator is configured to raise the flare floor symbol towards the horizon line, and during a second phase of the flare subsequent to the first phase of the flare, the display generator is configured to maintain the flare floor symbol at a constant distance from the horizon line.

3. The system according to claim 1, wherein the offset with respect to the nominal flare control law of the flare floor symbol varies according to a vertical velocity of the aircraft.

4. The system according to claim 1, wherein the display generator is configured to display a flare initiation symbol, located above the flare floor symbol, the display generator being configured to define with a velocity vector symbol, a position for a recommended start of flare.

5. The display system according to claim 1, wherein, when approaching the landing strip, the display generator is configured to generate, on the horizon line, a deformed region according to a topographic slope of the landing strip approached by the aircraft, the flare floor symbol being arranged facing the deformed region.

6. The system according to claim 1, wherein the flare floor symbol includes a horizontal segment parallel to the horizon line.

7. The system according to claim 6, wherein the flare floor symbol is horizontally centered on the velocity vector symbol.

8. The system according to claim 1, comprising a warning generator configured to generate a visual, an auditory or a tactile warning when the velocity vector symbol moves below the flare floor symbol.

9. A display method in an aircraft, comprising the following steps:

providing the system according to claim 1;

when approaching a landing strip, displaying on the display by the display generator, below the horizon line, of a flare floor symbol defining, along with the horizon line, a range of possible slope values for the flare.

10. The system according to claim 1, wherein the display generator is configured to display the flare floor symbol to further show an unrecommended range of slope values.

11. An aircraft display system for an aircraft, comprising: a display; and a display generator configured to dynamically display on the display a horizon line, a slope scale with respect to the horizon line, and a velocity vector;

the display generator being configured to display, below the horizon line, a flare floor symbol when approaching a landing strip, the flare floor symbol defining, along with the horizon line, a range of possible slope values for a flare of the aircraft, wherein a vertical offset of the flare floor symbol with respect to the horizon line is defined according to a nominal flare control law, a set point of the nominal flare control law being between the flare floor symbol and the horizon line.

12. The system according to claim 11, wherein a vertical offset of the flare floor symbol with respect to the set point of the nominal flare control law is constant and/or is variable.

13. The system according to claim 11, wherein the set point of the nominal flare control law is halfway between the flare floor symbol and the horizon line.

14. The system according to claim 11, wherein during a first phase of the flare, the display generator is configured to move the flare floor symbol with respect to the horizon line to vary a vertical offset of the flare floor symbol with respect to the set point of the nominal flare control law.

15. An aircraft display system for an aircraft, comprising: a display; and a display generator configured to dynamically display on the display a horizon line, a slope scale with respect to the horizon line, and a velocity vector;

the display generator being configured to display, below the horizon line, a flare floor symbol when approaching a landing strip, the flare floor symbol defining, along with the horizon line, a range of possible slope values for a flare of the aircraft, wherein the display generator is configured to display a flare initiation symbol, located above the flare floor symbol, the display generator being configured to define with a velocity vector symbol, a position for a recommended start of flare.

16. The system according to claim 15, wherein the position for the recommended start of flare corresponds to a horizontal coincidence between the velocity vector symbol and the flare initiation symbol.

17. The system according to claim 15, wherein the display generator is configured to delete the display of the flare initiation symbol starting from a position of the recommended start of flare.

18. The system according to claim 15, wherein the display generator is configured to determine a nominal flare control law defining a vertical speed increase profile during the flare, the position of the flare floor symbol being defined according to the nominal flare control law, with an offset with respect to the nominal flare control law, the flare initiation symbol being positioned according to the nominal flare control law.

19. The system according to claim 15, wherein the display generator is configured to, during an initial phase, raise the flare floor symbol together with the flare initiation symbol.

20. The system according to claim 15, wherein the display generator is configured to display the flare floor symbol, during an initial phase, offset vertically below the position of the flare initiation symbol.

* * * * *